Nov. 18, 1941.   D. W. STROM   2,262,782
VARIABLE SPEED MECHANISM
Filed Aug. 30, 1939   2 Sheets-Sheet 1

INVENTOR
David W. Strom
by Parker, Rockwood & Farmer.
ATTORNEYS

Nov. 18, 1941.   D. W. STROM   2,262,782
VARIABLE SPEED MECHANISM
Filed Aug. 30, 1939   2 Sheets—Sheet 2
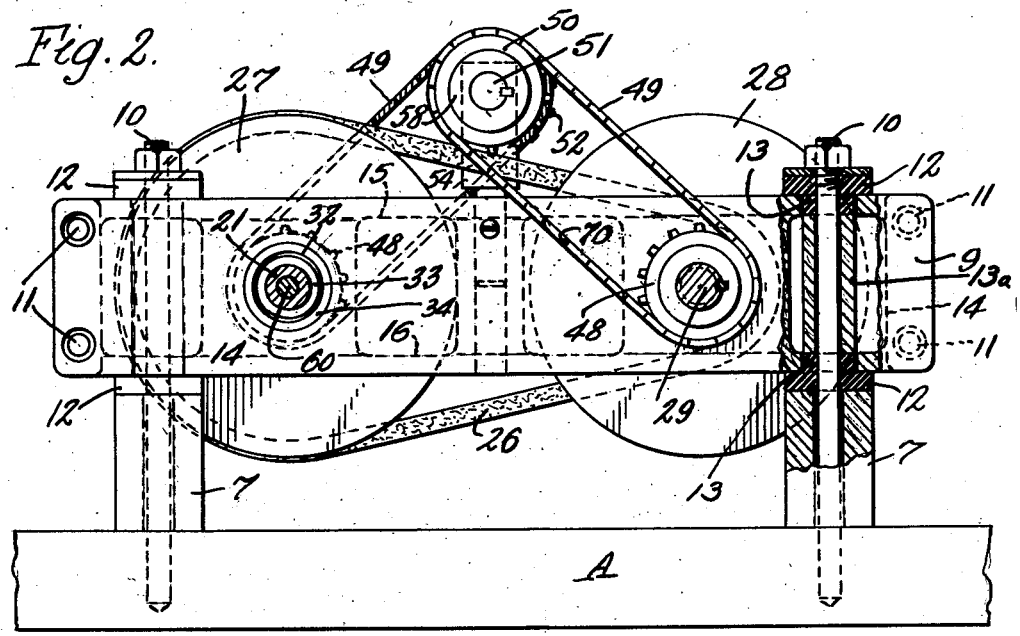
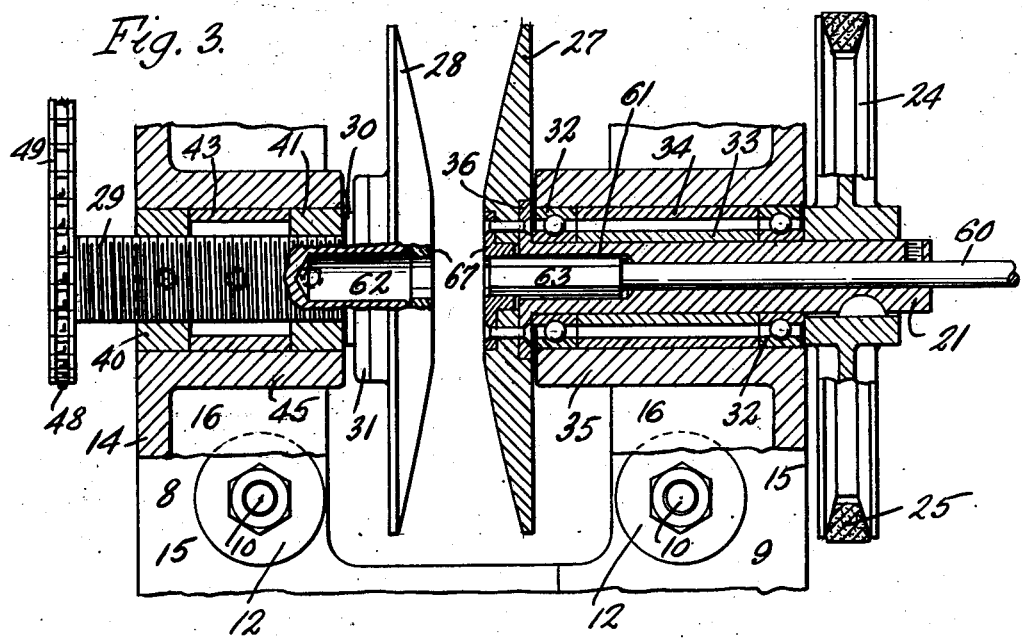

Patented Nov. 18, 1941

2,262,782

UNITED STATES PATENT OFFICE 2,262,782

VARIABLE SPEED MECHANISM

David W. Strom, Elmira, N. Y., assignor to Hardinge Brothers, Inc., Elmira, N. Y.

Application August 30, 1939, Serial No. 292,681

16 Claims. (Cl. 74—230.17)

This invention relates to improvements in mechanisms for producing variable speeds, and more particularly to mechanisms of this kind of the belt driven type.

There are on the market at the present time many types of variable speed mechanisms which are quite satisfactory when operated at relatively slow speeds. When these mechanisms are operated at high speeds, as required for driving many modern machines, these mechanisms become noisy, vibrate excessively and wear at their belts rapidly. Vibration is particularly objectionable when the mechanism is to be used in connection with a precision machine or implement, such as a lathe, in which the vibrations produce irregularities in the cut and thus produce defective work.

One of the objects of this invention is to provide an improved mechanism of this kind which is quiet in operation and free from vibration when operated at high speed.

Another object of this invention is to provide a mechanism of this kind of improved construction, which is readily adjustable and which is so constructed that the driving belt may easily be removed from a pulley or sheave and replaced by another belt.

Another object of this invention is to provide a variable speed mechanism of this kind, in which a belt operates in conjunction with a pair of pulleys each comprising a pair of cones, one of which is adjustable relatively to the other, the two cones of a pulley being rotatably mounted independently of each other.

Another object is to provide a change speed mechanism of this kind with means of improved construction for quickly removing a driving connection between the two cones of a pulley so that a belt may be removed by passing the same between the cones.

Other objects of this invention will appear from the following description and claims.

In the accompanying drawings:

Fig. 2 is a sectional side elevation thereof, the section being taken approximately on line 2—2, Fig. 1, on a reduced scale.

Fig. 3 is a fragmentary sectional plan view thereof showing the parts in the position in which the two cones of a pulley are disconnected.

Figure 1:
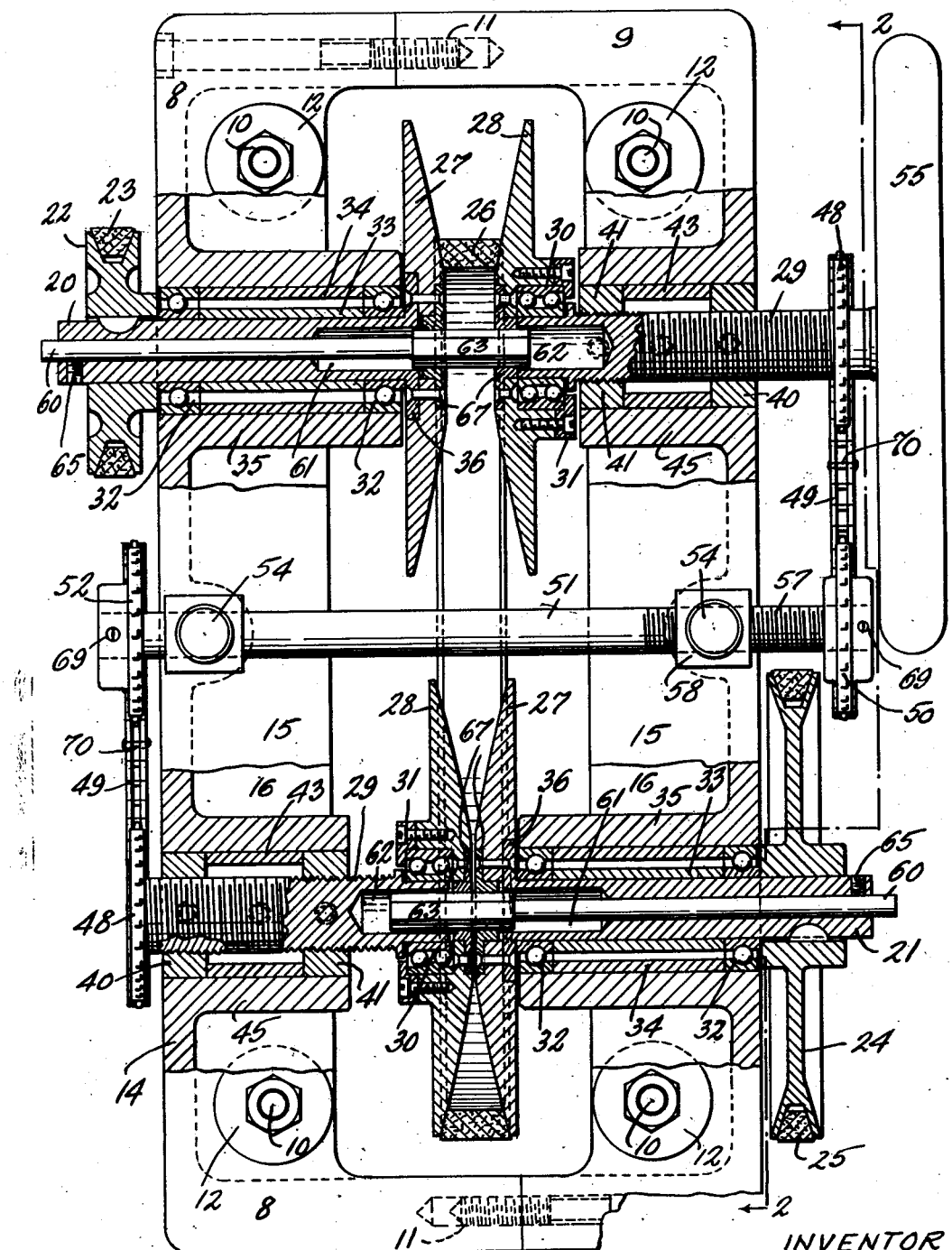
Fig. 1 is a sectional plan view of a speed change mechanism embodying this invention.

In order to provide a large variation in speed, I have shown in the accompanying drawings a mechanism employing two pulleys embodying my invention. It will be understood, however, that it is not intended to limit this invention to a speed change mechanism having two adjustable pulleys, since considerable variation in speed may be obtained by means of a single adjustable pulley.

In the particular embodiment of the invention shown by way of illustration in the accompanying drawings, A, Fig. 2, represents a base on which the variable speed mechanism may be mounted. This base may be a table or shelf upon or below which the variable speed mechanism is mounted, or the base may be in the form of an upright or inclined support for the mechanism. A plurality of columns or posts 7 extend outwardly from the base for supporting the mechanism in spaced relation thereto. This mechanism includes a frame member of any suitable construction, that shown comprising two equal parts 8 and 9, each of which forms a complete side of the frame member and portions of the two ends thereof. The sides of the frame member are preferably of channel-shaped cross section. The two parts of the frame member may be secured together in any suitable manner, for example, by means of bolts or screws 11 arranged in the end portions of the frame member.

The frame member may be mounted on the base in any suitable manner. In the particular construction shown by way of example, bolts 10 extend through suitable apertures in the channel-shaped side portions of the frame members and through the posts 7 and are secured to the base A. A resilient or cushion mounting may also be provided, if desired, and for this purpose, rubber washers 12 may be provided about the bolts 10 at opposite faces of the frame member. Smaller washers or sleeves 13 may be provided within the apertures or bolt holes in the frame member to keep the bolts out of metallic contact with the frame member. A spacing sleeve 13a is shown for holding the washers or sleeves 13 in place. Any other form of mounting for the frame member may be provided, if desired.

The four sides of the frame member form a substantially hollow rectangle with a relatively large opening in the middle portion thereof. The two longer sides of the frame member shown are of approximately channel-shape, being provided with an outer peripheral wall 14 having integral flanges 15 and 16. The frame member shown is desirable, since it is made of two equal parts, both of which can be cast from the same pattern, and the parts can be easily assembled and separated. A frame member of any other suitable or desired construction may, however, be employed if desired.

The frame member forms a support for the bearings of the shafts of the change speed mechanism. Each pulley includes two cone disks, and each cone disk is mounted on its own shaft. The shafts 20 and 21 each have a cone disk rigidly mounted thereon, and these shafts transmit power into and out of the change speed mechanism. Either shaft may be connected with the driving motor while the other shaft delivers the power from the change speed mechanism. The shaft 20, in the construction shown, is provided with a relatively small pulley 22 cooperating with a belt 23, and the other shaft 21 is provided with a larger pulley 24 cooperating with a belt 25. If the change speed mechanism is to be employed for delivering power at reduced speed, then the motor or other driving member is preferably connected with the belt 25 to drive the larger pulley 24, whereas if the mechanism is employed for providing increased speed, the driving motor (not shown) is preferably provided with a larger pulley connected by the belt 23 to the smaller pulley 22. Any other means may, of course, be provided for transmitting power to and from the shafts 20 and 21.

Each pulley or sheave of the change speed mechanism includes a pair of disks 27 and 28, each of which has a convex surface which may be of substantially frusto-conical shape. These convex surfaces of the two disks of a pulley face each other to form a pulley capable of cooperating with a belt 26 of a modified V type whose opposite, bevelled or inclined edges engage with the convex faces of the disks to form a driving connection with the pulleys. Preferably, the convex faces of the disks are slightly curved or bowed outwardly, so that the disks are not truly frusto-conical. The advantage of this construction will be hereinafter pointed out. If the disks are made so as to be accurately in balance, vibrations due to unbalanced conditions of the disks are avoided. The balancing of the disks may be effected in any suitable or well known manner, no balancing means being shown. For convenience, these disks will be herein referred to as "cone disks," and the driving faces thereof are referred to as "convex," regardless of whether they are frusto-conical or curved in cross section. Since the two pulleys and their bearing mountings are identical, only one of them will be specifically described.

The cone disk 27 of one pulley is rigidly connected to the shaft 20 and the corresponding disk of the other pulley is secured to the shaft 21. The other cone disk 28 of each pulley is rotatably mounted and adjustable toward and from the cone disk 27 to vary the effective diameter of the pulley formed by the two disks. In the particular construction shown, the cone disk 28 is rotatably mounted on an adjustable and normally non-rotating shaft or rod 29, for example, by means of a suitable ball bearing 30, which is so formed that the disk 28 is free to rotate about the adjustable shaft 29 but is held against endwise movement relatively to the same. For this purpose, the inner race ring or sleeve of the ball bearing is secured to the end of the shaft or rod 29 and the outer race ring or sleeve is secured to the cone disk 28, for example, by means of an annular sleeve 31 secured by screws or other means to the hub of the cone disk 28.

The other shaft 20 on which the disk 27 is secured, is suitably journalled on the frame of the mechanism. In the construction shown, a pair of ball bearings 32 is provided for this purpose, which are spaced apart by means of a pair of concentric sleeves 33 and 34. The inner race rings of the bearings 32 and the sleeve 33 are suitably secured to the shaft 20, and the outer race rings of the ball bearings and the outer sleeve 34 are suitably secured to a hub or cylindrical boss 35, preferably formed integrally with the frame of the mechanism. The inner ends of the shafts 20 and 21 are preferably provided with outwardly extending flanges 36 to which the cone 27 may be suitably secured in any suitable manner, for example, by means of rivets, as shown. Any other means for journalling the shafts 20 and 21 and for securing the cone disks 27 thereto may be employed.

The adjustable shaft 29 may be adjusted in any suitable manner, that shown being normally non-rotating and being moved axially relatively to the frame of the mechanism, by threading the outer surface of the shaft 29. This threaded shaft 29 engages with corresponding internal threads in a pair of sleeves or collars 40 and 41 which may be spaced apart by means of another sleeve 43 of larger internal diameter. The sleeves or collars 40, 41 and 43 are secured to a cylindrical boss 45, preferably formed integral with the frame member of the mechanism in any suitable manner, for example, by means of set screws 44 indicated in broken lines in Figs. 1 and 3. This construction has the advantage that as the repeated adjustment of the shafts 29 relatively to the internally threaded sleeves 40 and 41 produces wear on the threads, resulting in looseness of the shaft 29, one or both of the sleeves 40 and 41 may be turned to a slight extent upon releasing the corresponding set screw 44, to take up the wear in the screw threads. In this manner, vibrations due to looseness of the shafts 29 may be avoided.

From the foregoing description, it will be obvious that the effective diameter of a pulley formed by the cone disks 27 and 28 may readily be varied by turning the adjusting shafts 29 so as to move the cone disk 28 toward and from the other disk 27. When two pulleys are employed, the cone disk 28 of one pulley is moved toward its cooperating disks 27 while the disk 28 of the other pulley is moved away from its cooperating disk 27. In this manner, the effective or driving diameter of one pulley is increased while that of the other pulley is decreased. In this manner, the belt tension is maintained approximately uniform. However, by making the frusto-conical faces of the two disks slightly curved as described, the belt may be maintained at uniform tension throughout all adjustments of the disks relatively to each other, thus eliminating the need for an idler.

Means are preferably also provided for simultaneously moving the cone disks 28 of the two pulleys relatively to their cooperating disks 27. For this purpose, the two adjusting shafts 29 of the two pulleys are connected with each other in any suitable manner for simultaneous rotation. For example, each shaft 29 may have a sprocket wheel 48 rigidly secured thereon, each of these sprocket wheels cooperating with a sprocket chain 49. One of the chains 49 also cooperates with another sprocket wheel 50 mounted on one end of a countershaft 51 and the other sprocket chain 49 cooperates with another sprocket wheel 52 mounted on the other end of the countershaft 51.

This shaft may be rotatably mounted on the frame of the mechanism in any suitable or desired manner, for example, by means of a pair of upwardly extending posts 54, the lower ends of which are secured to the frame of the mechanism, and the other ends of which rotatably support the sprocket shaft 51. One of the threaded shafts 29 is preferably also provided with a hand wheel 55 for turning the shaft 29. Any rotation of the hand wheel 55 is transmitted directly to the shaft 29 to which it is connected and also through the sprocket chains 49 and shaft 51 to the other threaded shaft 29. The construction shown also results in the moving of one cone disk 28 toward its cooperating disk 27, while the other cone disk 28 is moved in the opposite direction relatively to its disk 27, which results in maintaining the belt 29 under the same tension at all times, as described.

In order to compensate for the endwise movement of the shafts 29 when turned by means of the hand wheel and sprocket gearing described, the countershaft 51 is provided with a threaded portion 57 which cooperates with a correspondingly internally-threaded part 58 at the upper end of one of the posts 54. If the pitch of the thread on the portion 57 is similar to the pitch of the threaded portions of the shafts 29, then the shaft 51 will move transversely of the mechanism to the same extent as the shafts 29. Consequently, the sprocket wheels 48 will always remain in proper alinement with the sprocket wheels 50 and 52 on the shaft 51.

It will be noted that as thus far described, each cone disk of a pulley may turn independently of the other. Preferably, however, I provide means whereby both cone disks of the pulley may be connected with each other to prevent relative rotary motion of the cone disks of a pulley. For this purpose, the shafts 20 and 21 are made hollow, being provided throughout the greater portions of the length thereof with a relatively small bore adapted to receive a stem 60 of a connecting member. The inner ends of the shafts 20 and 21 have a bore of larger diameter, indicated at 61. The shafts 29 are each provided with a bore or recess 62, which extends inwardly from the inner end thereof, this bore being substantially similar in dimensions to the bore 61 of the shafts 20 and 21. The inner end of the connecting member is provided with a non-circular connection portion or head 63, which has a driving connection with both of the cones of a pulley when in the position shown in Fig. 1, but which may be withdrawn into the bore or recess 61, as shown in Fig. 3. The stem 60 of each connecting member may be held in any desired position, for example, by means of a set screw 65. The connecting portion or head 63 may establish a driving connection between the two disks 27 and 28 in any suitable or desired manner. In the particular construction illustrated, the head 63 is of hexagonal cross section and cooperates with hexagonal portions of the cone disks which it connects. Preferably, I provide on each cone disk, a smaller disk 67 having a hub portion which is of the same cross sectional shape as the head of the connecting member 63, these disks 67 being provided with hexagonal apertures in the construction illustrated, in which the head of the connecting member may engage. The disks 67 may be secured to the cone disks in any suitable manner, for example, by means of rivets, the same rivets being employed for holding the disk 67 on the cone disk 27 as are used for holding this disk on the flange 36. The connecting member 63 and associated parts may be omitted if desired, since they are mainly needed when the mechanism is called upon to transmit considerable power.

The construction described results in a change speed mechanism which may be operated at high speeds without any objectionable vibration. This is due to a large extent to the fact that the two cone disks of each pulley are mounted on separate shafts or bearings. The two separately mounted disks can be more easily mounted on the frame of the mechanism to operate quietly and without vibration than would be possible if the two disks were mounted on the same shaft with one of them adjustable lengthwise thereof, which would necessitate a certain amount of looseness of the adjustable cone disk on the shaft in order to make the adjustment possible. This freedom from vibration not only is necessary in driving precision machines, but also greatly increases the life of the belt.

By mounting the bearings for the cone disks 28 on the adjustable shafts so that each bearing is moved with its cone disk 28, the cone disk remains in correct adjustment and relation to its bearing during all movements of the adjustable disk relatively to its cooperating disk. Consequently, by means of this arrangement, vibration of the mechanism can be prevented even when the same operates at high speeds.

Another advantage resulting from the independent mounting of the two cone disks on separate shafts and in the removable driving connection between the two cone disks is that by means of this construction, the belt can be easily removed from the disks and replaced by another belt. In order to do this, both of the disks 28 can be separated from their cooperating disks 27. In order to permit this to be done, the sprocket wheels 50 and 52 may be detachably secured on the sprocket shaft 51 in any suitable manner, for example, by means of set screws 69, so that the two cone disks 28 may be moved independently of each other, or the chains 49 may be provided with removable pins 70, so that one or both of these chains may be removed from their sprocket wheels. When the disks of both pulleys are separated, the belt 29 will, of course, be loose, so that a portion thereof can easily be turned through approximately a right angle to permit it to pass between the separated disks of the pulley, this being done when the connecting member 63 is in the position shown in Fig. 3.

The construction described has the further advantage that the tension of the belt 26 can be readily adjusted, for example, for compensating for wear or stretch on the belt. This can be done by removing one of the chains 49 and turning a shaft 29 in a direction to move the adjustable disk 28 toward the disk 27. Devices of this kind are frequently provided with indicators (not shown in this application), for indicating the speed ratio for which the mechanism is adjusted, this being easily done by providing an indicator which shows the position of the adjusting wheel 55. When a device of this type is used, the movement of one adjustable disk 28 without a corresponding adjustment of the other disk 28 will change the ratio so that the gauge will not be correct. This, however, may be avoided by means of the construction shown, when adjusting the tension of the belt 26, by moving each of the adjustable disks 28 toward its cooperating disk 27 substantially to the same extent. After making such adjustment, the chain 49, which has been removed, is replaced, whereupon the slack in the belt is taken up without a substantial variation in the speed ratio of the mechanism.

The forming of the frame of the mechanism in two separate parts extending lengthwise of the mechanism has a further advantage that the various parts of the mechanism can be readily assembled or taken part when the two frame parts are separated. Furthermore, the mechanism is so constructed that by releasing the connecting bolts 11 and removing the sprocket wheels 52 from the countershaft 51, the mechanism may be immediately divided into two parts, since there are no other connecting means which require releasing. When thus separated, all parts of the mechanism are easily accessible.

I claim as my invention:

1. A sheave comprising a pair of disks having convex surfaces facing each other and spaced to receive a flexible belt between them, a rotatable shaft having one of said disks rigidly secured to an end thereof, a bearing for the other disk which provides rotation of said other disk independently of said shaft and in spaced relation thereto, and means for moving one of said disks toward and from the other disk.

2. A sheave comprising a pair of disks having convex surfaces facing each other and spaced to receive a flexible belt between them, a rotatable shaft to which one of said disks is secured and which terminates at said disk, a relatively stationary support on which the other disk is mounted to rotate independently of said first disk, means for adjusting said stationary support to move said other disk toward and from said first disk, and a removable driving connection between said disks which may be removed without moving said shaft and which, when removed, permits removal and replacing of a belt.

3. A sheave comprising a pair of disks having convex surfaces facing each other and spaced to receive a belt between them, a rotary shaft having one of said disks mounted for rotation therewith, said other disk being spaced from said first disk and from said shaft, a bearing for said other disk, and adjusting means for moving said other disk and its bearing toward and from said first disk, and for moving said other disk from said first disk and said shaft to an extent sufficient to permit said belt to be passed between said disks.

4. A sheave comprising a pair of disks having convex surfaces facing each other and spaced to receive a belt between them, a rotatable shaft on which one of said disks is secured, a bearing for the other disk which is mounted independently of said shaft and permits rotation of said other disk relatively to said first disk, means for adjusting said other disk and its bearing toward and from said first disk, and means movable independently of said shaft and said disks into and out of position for releasably connecting said disks to cause the same to rotate in unison.

5. A sheave comprising a pair of disks having convex surfaces facing each other and spaced to receive a belt between them, a hollow rotatable shaft to which one of said disks is rigidly secured, an adjustable support on which the other disk is mounted to rotate independently of said first disk and which is adjustable to move said other disk toward and from said first disk, and a connecting device arranged in said hollow shaft and movable out of said hollow shaft into driving engagement with said other disk to cause said disks to rotate in unison.

6. A sheave comprising a pair of disks having convex surfaces facing each other and spaced to receive a belt between them, a hollow rotatable shaft to which one of said disks is secured, an adjustable support on which the other disk is mounted to rotate independently of said first disk and which is adjustable to move said other disk toward and from said first disk, a connecting device arranged in said hollow shaft and movable out of said hollow shaft into driving engagement with said other disk to cause said disks to rotate in unison, said connecting device having a part extending beyond the outer end of said hollow shaft for moving said connecting member into and out of said hollow shaft for connecting said disks, and means on said shaft for securing said connecting member in adjusted position.

7. A sheave comprising a pair of disks having convex surfaces facing each other and spaced to receive a flexible belt between them, a rotary shaft on which one of said disks is mounted, a second shaft having a bearing on the outer portion thereof and on which said other disk is mounted to rotate about said second shaft independently of said other disks, said second shaft having a threaded portion whereby rotation of said second shaft adjusts said other disk toward and from said first disk, and means for releasably connecting said disks to cause the same to rotate in unison.

8. A variable speed mechanism including a frame, a belt, a pair of sheaves mounted on said frame and each comprising a pair of disks having convex surfaces facing each other and spaced to receive said belt between them, a driving shaft journalled in said frame and having the disk of one sheave secured thereon, a driven shaft also journalled in said frame and having a disk of the other sheave secured thereto, a pair of adjustable members mounted on said frame and movable toward and from said shafts in the direction of the axes thereof, said other disks of said sheaves being journalled on said adjustable members to rotate independently of each other and being adjustable toward and from said first mentioned disks, and means operable at will independently of said disks and said shafts for connecting the disks of a sheave to cause said disks to rotate in unison, said belt being removable from said sheaves by passing the same between said disks when said disks are separated and when said connecting means are moved into a non-connecting position.

9. A variable speed mechanism, including a frame, a belt, a pair of sheaves mounted on said frame and each comprising a pair of disks having convex surfaces facing each other and spaced to receive said belt between them, a driving shaft journalled in said frame and having the disk of one sheave secured to an end portion thereof, a driven shaft also journalled in said frame and having a disk of the other sheave secured to an end portion thereof, a pair of adjustable members mounted on said frame and movable toward and from said shafts in the direction of the axes thereof, said other disks of said sheaves being journalled on said adjustable members to rotate independently of each other and being movable with said members toward and from said first mentioned disks and toward and from said shafts, means operable at will independently of said shafts for connecting the disks of a sheave to cause said disks to rotate in unison, said belt being removable from said sheaves by passing the same between said disks when said disks are separated and when said connecting means are moved into a non-connecting position, and means for simultaneously operating both of said adjustable members.

10. A pair of sheaves each comprising a pair of disks having convex surfaces facing each other and spaced to receive a belt between them, each of said disks being journalled to rotate independently of the other, a power transmitting shaft rigidly secured to a disk of one sheave, another power transmitting shaft rigidly secured to a disk of the other sheave, means operatively connected with the other disks of said sheaves for adjusting the same toward and from said first mentioned disks and for spacing said first mentioned disks from said other disks for permitting the belt to be passed between the disks, and releasable means associated with each sheave and movable independently of said shafts into and out of driving connection with both of said disks to cause the same to rotate in unison.

11. A sheave comprising a pair of disks having convex surfaces facing each other and spaced to receive a belt between them, each of said disks being journalled to rotate independently of the other, means operatively connected with a disk for adjusting the same toward and from the other disk and for spacing said first mentioned disk from said other disk for permitting the belt to be passed between them, a power shaft secured to one of said disks, the axial portions of said disks being provided with non-circular apertures, and a connecting member which is movable independently of said shaft into a position to extend into the apertures of said disks and to engage in said non-circular apertures to form a driving connection between said disks and which may be withdrawn from one of said disks to provide an open space between said disks through which a belt may be passed.

12. A variable speed mechanism including a frame, a belt, a pair of sheaves each comprising a pair of disks having convex surfaces facing each other and spaced to receive said belt between them, a rotatable shaft for each sheave on which one disk of a sheave is secured, threaded shafts which are normally stationary and on which said other disks of said sheaves are mounted to rotate independently of their cooperating disks and which have a threaded engagement with a fixed part of said frame, whereby the turning of said threaded shafts moves the same axially to adjust said other disks relatively to said first disks, a countershaft mounted on said frame and having a threaded engagement therewith of similar pitch to the threads of said other shafts, and gearing connecting said other shafts and said countershaft, whereby said other shafts and countershaft advance axially in the same direction during adjustment of said other disks.

13. A variable speed mechanism including a frame, a belt, a pair of sheaves each comprising a pair of disks having convex surfaces facing each other and spaced to receive said belt between them, a rotatable shaft for each sheave, one disk of each sheave being secured to one of said shafts, said shafts being held against axial movement, threaded shafts on which the other of said disks are journalled, each to rotate independently of its cooperating disk, said threaded shafts engaging stationary threaded parts of said frame and being adjustable toward and from said first mentioned disk to move said adjustable disks relatively to said first disks, gearing connecting said threaded shafts for simultaneously moving one of said adjustable disks toward its cooperating disk while the other adjustable disk is moved away from its cooperating disk, and means for disconnecting said gearing to permit an adjustable disk to be moved relatively to its cooperating disk independently of the other adjustable disk.

14. A variable speed mechanism including a frame, a belt, a pair of sheaves each comprising a pair of disks having convex surfaces facing each other and spaced to receive said belt between them, a rotatable shaft for each sheave, one disk of each sheave being secured to one of said shafts, said shafts being held against axial movement, threaded shafts on which the other of said disks are journalled, each to rotate independently of its cooperating disk, said threaded shafts engaging stationary threaded parts of said frame and being adjustable toward and from said first mentioned disk to move said adjustable disks relatively to said first disks, gearing including a sprocket chain for connecting said threaded shafts for simultaneously moving the adjustable disk of one sheave toward its cooperating disk while the adjustable disk of the other sheave is moved away from its cooperating disk, said sprocket chain being detachable from said gearing to permit said adjustable disks to be moved independently of each other relatively to their cooperating disks.

15. A variable speed mechanism of the type including a pair of sheaves connected by a belt and in which each sheave is formed of a pair of disks having convex surfaces facing each other, said mechanism including a frame comprising two substantially similar longitudinally extending parts releasably secured together, each frame part having one disk of each sheave mounted thereon to rotate about axes extending transversely thereof with the convex surfaces extending toward the same side thereof, said frame parts when secured together presenting the disks on one frame part in operative relation to and in axial alinement with the disks of the other frame part.

16. A variable speed mechanism according to claim 15 and provided with means operable at will for forming a driving connection between the disks of a sheave to cause the disks of the sheave to rotate in unison.

DAVID W. STROM.